Patented July 1, 1930

1,769,793

UNITED STATES PATENT OFFICE

WILLIAM G. LEAMON, OF NEWARK, OHIO

PROCESS OF TREATING OILS TO IMPROVE THE SAME

No Drawing.    Application filed November 2, 1923.   Serial No. 672,438.

This invention relates to processes of treating oils to improve the same; and it relates more particularly to the treatment of mineral oils and products thereof, especially motor fuels of the gasoline type as well as other relatively light distillates such as kerosene, to remove therefrom gum-forming or resinifying constituents, the invention being particularly useful in the treatment of petroleum products derived from cracking processes and containing substantial percentages of unsaturated compounds.

This application is in part a continuation of prior copending applications of this applicant, Serial No. 621,076, filed February 24, 1923, and Serial No. 624,268, filed March 10, 1923; and it relates generally to the novel type of treating processes disclosed in said applications. In the processes described and claimed in the prior copending applications aforesaid, gasoline or other motor fuel to be stabilized or purified by removal of resin- or gum-forming constituents therefrom is treated with a catalytic polymerizing or condensing agent dissolved in a solvent differing from the oil to be treated but miscible therewith or soluble therein, this treatment being effective to polymerize resinifying or gum-forming constituents in the oil and enabling separation thereof in such manner as to produce oils of marked superiority as regards stability and other desirable properties. In particular, the treatment is useful especially for the improvement of motor fuels, such as gasolines, resulting from processes of cracking heavy mineral oils and residua, such cracked motor fuels being characterized by large content of unsaturates, including polymerizable constituents which are responsible for the formation of gums or resins that manifest their presence in commercial motor fuels previously known in the art.

The prior applications aforesaid mention a number of polymerizing or condensing agents suitable for use in the type of process just referred to, among those enumerated being aluminum chlorid, zinc chlorid, and ferric chlorid. Suitable non-aqueous solvents in which the polymerizing agent may be dissolved for effective dissemination through the oil to be treated were also mentioned, these including ordinary sulphuric ether (ethyl ether), and mononitrobenzene. The earlier of the aforesaid applications emphasizes more particularly the employment of anhydrous aluminum chlorid in the purifying treatment; whereas the second of said applications is directed especially to the employment of anhydrous zinc chlorid which was found to offer certain practical advantages in many cases over anhydrous aluminum chlorid.

Continued practical use of the type of treating process covered by the aforesaid prior copending applications has brought to light certain further details of procedure that can be employed to advantage, and it is with these improvements that the present application deals more particularly. It has been found, for example, that if the treating solution of the polymerizing or condensing agent added to the oil to be treated is made up by adding to the non-aqueous solvent (ether for example) a greater quantity of the polymerizing or condensing salt than the given amount of solvent normally dissolves at ordinary temperatures, the resultant mixture, which is evidently in part a solution and in part a suspension of very finely divided solid matter in the solution, is especially effective in its action upon the oil to be treated. Furthermore, by proceeding in this way, the amount of solvent employed can be cut down very materially and a substantial economy thus effected. Whether the suspended matter in the mixture is the salt itself or is a compound thereof with the solvent is not known at this time and is not material to the practice of the invention.

It has also been found that when zinc chlorid is employed as the polymerizing and condensing agent, it is not necesary that this salt be strictly anhydrous. Zinc chlorid containing less than the theoretical maximum of water of hydration or constitution, that is, zinc chlorid which still retains in some degree its avidity for moisture, can be used successfully even though it is not what can strictly be called anhydrous zinc chlorid. This is important in that it renders feasible the use of ordinary commercial granulated zinc chlorid. Nor would this possibility be expected in view of the fact that in employing aluminum chlorid as the polymerizing or condensing agent, it is necessary to use the anhydrous compound in order to obtain action of a substantial character. It has also been found that the methods of the aforesaid prior applications can be further modified to advantage under some circumstances by effecting the treatment of the oil in vapor form instead of liquid form as described in said application.

The foregoing advantages of the present invention, as well as others which will become apparent as the description proceeds, will become more fully apparent from the following description of certain desirable practical embodiments of the invention.

Let it be assumed, for example, that the mineral oil product to be treated is a crude motor fuel distillate. One practical way of treating such a product in accordance with this invention is to commingle therewith a very small percentage of zinc chlorid carried by a solvent such as an ether, sulphuric ether for example, and then to redistill the crude motor fuel to obtain a refined motor fuel of the desired specifications. In practice, ordinary commercial granulated zinc chlorid can be used, about two to three pounds thereof being added to each gallon of ether in making up the treating solution. Upon adding the zinc chlorid to the ether, a violent reaction ensues, owing probably to formation of a zinc-ether complex of some kind. After the reaction has stopped and the solution has cooled down to ordinary temperatures, it will be found that the mixture is somewhat milky owing apparently to the presence of very finely divided solid matter in suspended or colloidal condition. One gallon of ether normally takes up about 1.5 pounds of zinc chlorid to form a clear solution, a larger proportion of zinc chlorid giving the milky mixture described. This milky mixture is added to the crude motor fuel in such proportion that the polymerizing agent, figured as zinc chlorid ($ZnCl_2$), is present in amount equal to about 0.20 per cent of the weight of motor fuel treated. An even smaller percentage, say as little as 0.10 per cent is often entirely sufficient, especially where the motor fuel to be treated is low in content of impurities and is of good color. In no case is it ordinarily necessary to use much more than 0.20 per cent of the polymerizing agent, although it is to be understood that the invention is not restricted to the use of any specific proportion of the polymerizing agent. Generally speaking, use of the polymerizing agent in quantity amounting to only a minor fraction of one per cent by weight of the crude motor fuel distillate to be treated gives good results.

The crude motor fuel to which the treated solution has been added is now redistilled in the ordinary manner to produce a refined motor fuel. It is to be understood that the cut made to include such crude motor fuel may be, and desirably is, deep enough to include also a substantial proportion of kerosene and other relatively heavy oils in order that, in redistilling, the still bottom may be protected by a residue of higher boiling oils. The residue left in the still, which may amount to from 10 to 20 per cent of the original crude motor fuel treated, contains the higher oiling constituents of the crude motor fuel, and it also contains gummy and resinous polymers which, however, are not of such character as to cause difficulty in removing the residue from the still, such residue being freely fluid in character. In fact the proportion of such polymers therein is very small, and the refining loss due to their formation and removal is practically negligible. This freely fluid residue may of course be re-processed to obtain therefrom a further quantity of crude motor fuel.

The removal of resinifying and gum-forming constituents from the motor fuel treated as described is found to have been effected very completely and in even more satisfactory manner than where the treating liquid is a clear solution of zinc chlorid containing no suspended reagent. Just why this should be the case is not fully understood, but it is an observed fact. Moreover, because of the relatively smaller amount of solvent used this method of treating is even cheaper than where a clear solution is used although the latter is by no means expensive.

The refined motor fuel obtained by redistillation with a non-aqueous solution of a polymerizing agent, as described, is substantially free of gum-forming constituents and substantially water-white or better in color. It may, however, be still further treated if necessary or desirable before distribution in the trade. Ordinarily it is found desirable to filter the redistilled motor fuel through charcoal, fuller's-earth, bone char, or other adsorptive filtering material, this final step serving to brighten the product; or, expressed in the terms ordinarily applied in filter practice, this step renders it more brilliant.

Instead of adding the treating solution to the liquid motor fuel in the manner above described, it is also feasible, and in some cases highly desirable, to effect the treatment with a polymerizing agent while the motor fuel is in vapor form. In practice this can be done in various ways. For example, the vapors obtained by redistilling crude motor fuel may be conducted through a box or other form of treating chamber in which they are brought into intimate contact with the before described treating solution of a polymerizing agent. For instance, the solution of polymerizing agent may be contained in a receptacle provided with rotary paddle means or the like, the paddles alternately dipping into the solution and emerging therefrom with a film of the treating liquid thereover and the distillation vapors being compelled to pass into contact with the paddles as they emerge from the body of the treating solution. Other mechanical expedients for thoroughly exposing the distillation vapors to the treating solution can be availed of. The distillation vapors after being subjected to this treatment may then be passed through a dephlegmator to separate out the heavy resinous and gummy polymers formed as a result of the treatment, and the vapors surviving this treatment may then be condensed to form the refined motor fuel, filtration being also employed if desired to finish the product.

In still another way of carrying out the purifying treatment while the oil is in vapor phase, the vapors from which the crude motor fuel itself is condensed may be subjected to the action of the treating solution either by means of the revolving paddle arrangement before mentioned, or otherwise. For example, assuming it to be a question of obtaining from cracked oil vapors a motor fuel free from resinifying and gum-forming constituents, the vapors coming from the cracking chamber of any operative oil-cracking system, most desirably after removal of tarry and other very heavy constituents, may be treated by injecting into said vapors a metered amount of treating solution of the character herein described, for example, a solution of zinc chlorid in ether, either clear or containing some suspended matter giving the treating liquid a milky appearance. At the relatively high temperatures characterizing the cracked vapors, the dissemination of the injected treating solution throughout said vapors is extremely rapid, as is also the purifying reaction. By passing the vapors thus treated into a suitable dephlegmating system, the resultant resinous and gummy products can be readily separated out and mechanically removed, the vapors still persisting being then condensed in the usual way to obtain directly a motor fuel condensate free from resinifying and gum-forming constituents.

What is claimed is:

1. The process of improving a mineral oil which comprises subjecting the same to the modifying action of a liquid mixture of zinc chlorid with a solvent thereof differing from but miscible with said oil, said mixture containing a greater quantity of zinc chlorid than can be held in true solution by the quantity of solvent associated therewith.

2. The process of improving a crude motor fuel distillate which comprises redistilling such motor fuel in the presence of a solution of zinc chlorid in a solvent thereof differing from but miscible with said motor fuel, and condensing from the distillation vapors a motor fuel substantially free from resinous and gummy matter.

3. The process of refining a crude motor fuel which comprises mixing therewith a solution of zinc chlorid in a non-aqueous solvent and distilling the mixture to obtain a refined motor fuel distillate, the maximum quantity of zinc chlorid being substantially less than one per cent by weight of the crude motor fuel treated.

4. The process set forth in claim 3, further characterized by the fact that the treating solution is a mixture of zinc chlorid with an ether in such proportions that the zinc chlorid is not all dissolved to a clear solution.

5. The process set forth in claim 3 further characterized by the fact that the treating solution is a mixture of zinc chlorid with an ether in such proportions that the zinc chlorid is not all dissolved to a clear solution, and by the fact that the amount of zinc chlorid employed is only a minor fraction of one per cent of the weight of the motor fuel treated.

6. The process of improving a mineral oil which comprises treating the same with a mixture of a gum-polymerizing reagent with a non-aqueous solvent thereof differing from but miscible with said mineral oil, said reagent being present in quantity more than sufficient to saturate said solvent but amounting to substantially less than one per cent by weight of the mineral oil treated and separating resultant resinous or gummy matter from said oil.

7. The process set forth in claim 3, further characterized by the fact that the non-aqueous solvent employed is an ether.

8. The process set forth in claim 3, further characterized by the fact that the non-aqueous solvent employed is sulfuric ether.

In testimony whereof I hereunto affix my signature.

WILLIAM G. LEAMON.